W. B. HAINES.
SPOT LIGHT FOR AUTOMOBILES.
APPLICATION FILED AUG. 30, 1919.
1,339,954.
Patented May 11, 1920.
2 SHEETS—SHEET 1.
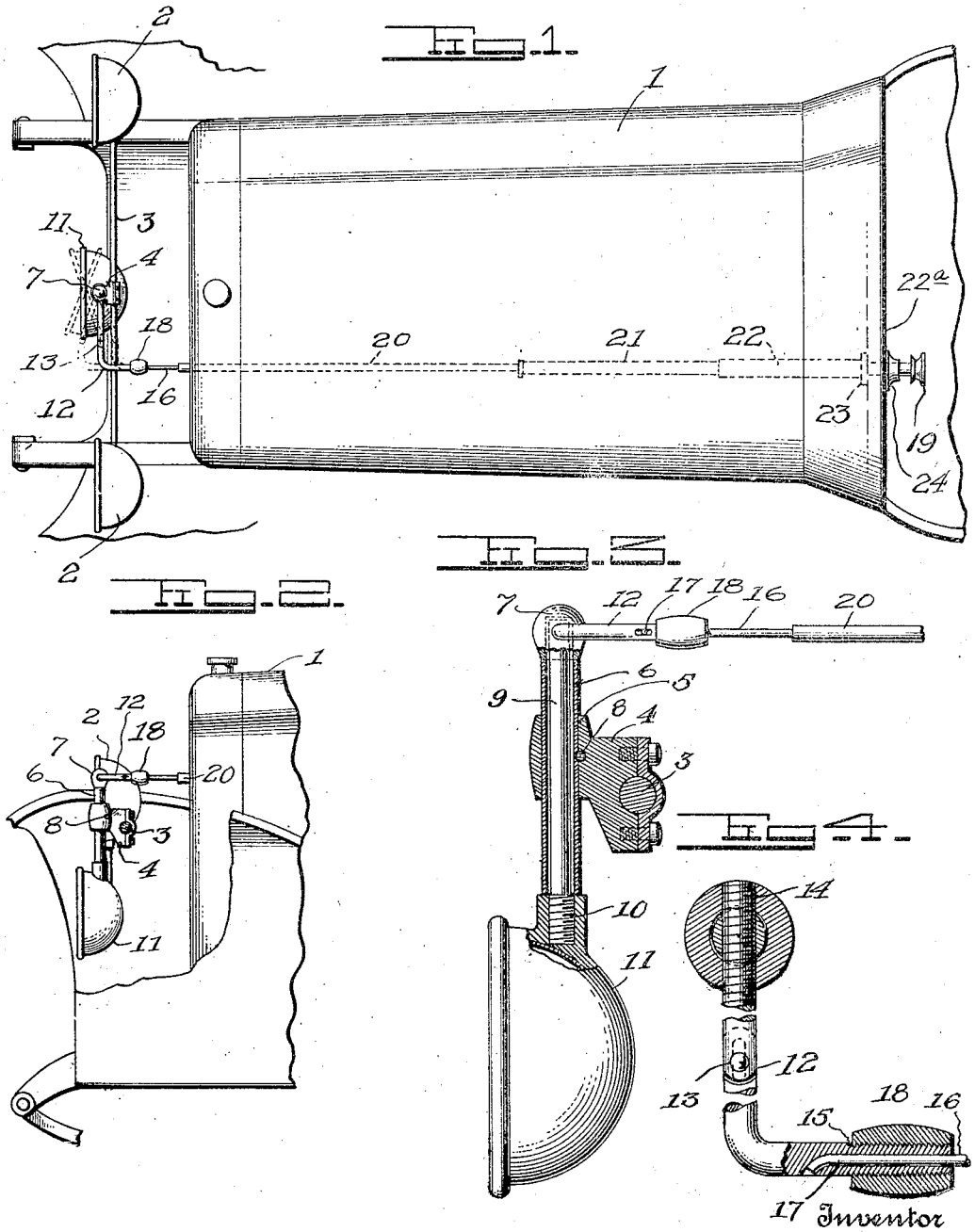

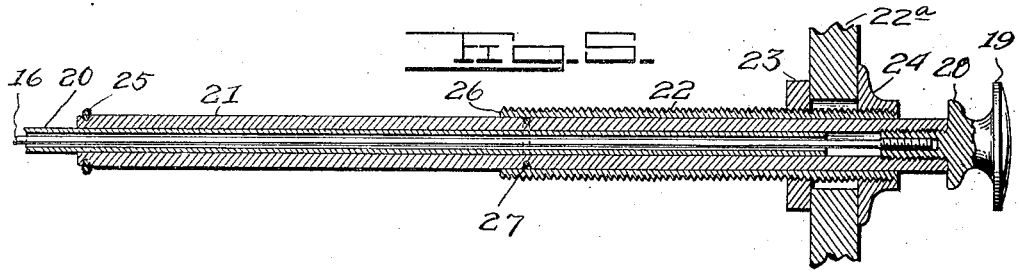
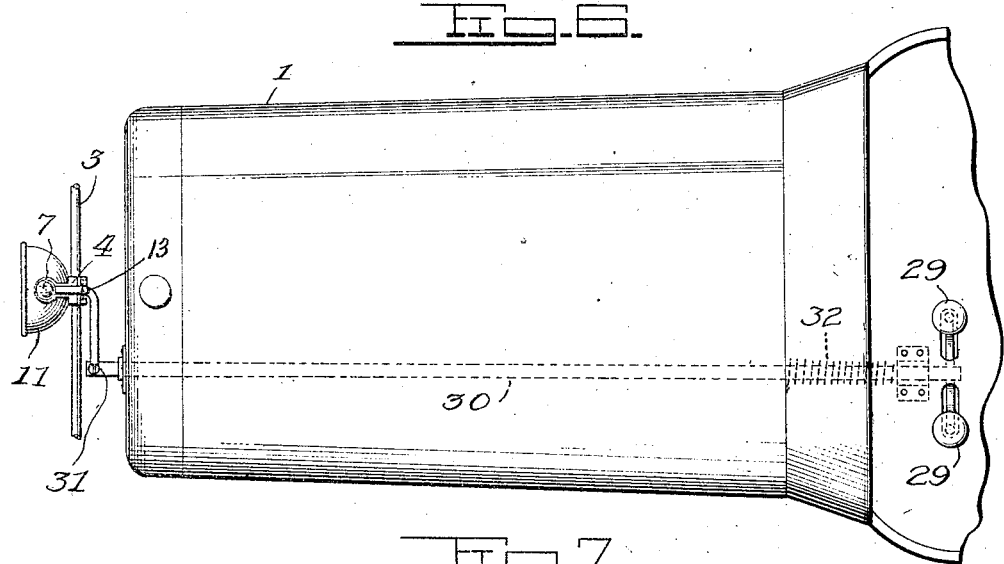
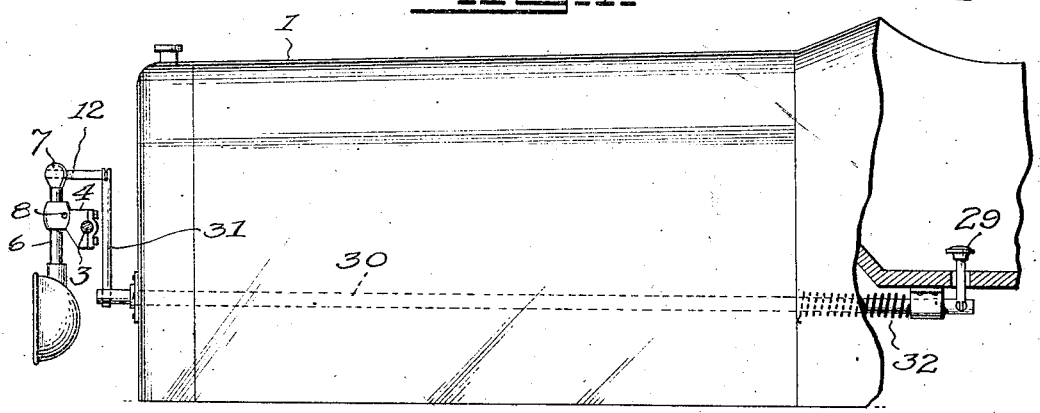

UNITED STATES PATENT OFFICE.

WILLIAM B. HAINES, OF SUNBURY, PENNSYLVANIA.

SPOT-LIGHT FOR AUTOMOBILES.

1,339,954.  Specification of Letters Patent.  Patented May 11, 1920.

Application filed August 30, 1919. Serial No. 320,800.

*To all whom it may concern:*

Be it known that I, WILLIAM B. HAINES, a citizen of the United States, residing at Sunbury, in the county of Northumberland and State of Pennsylvania, have invented certain new and useful Improvements in Spot-Lights for Automobiles, of which the following is a specification.

This invention relates to spot lights for automobiles and like vehicles, and means for actuating the same. The improved spot light is adapted to be placed immediately in front of an automobile midway between the fixed headlights. The spot light is movable either to the right or to the left, so that its rays may be thrown either to the inside or outside of the road at will.

The various features of the invention will be hereinafter more fully described in connection with the accompanying drawings, in which:—

Figure 1 is a top plan view of the invention applied to an automobile, with hand operating means for turning the spot light;

Fig. 2 is a side elevation of the same, one of the fenders being broken away and one of the headlights being omitted;

Fig. 3 is a side view of the spot light and its supporting and operating means, the supporting means being shown in central section;

Fig. 4 is a detail view showing the connections from the operating rod to the supporting rod for the spot light;

Fig. 5 is a longitudinal central section through the guide for the operating rod;

Fig. 6 is a top plan view of the invention applied to an automobile, with pedals for turning the spot light; and, Fig. 7 is a side elevation of the same.

Referring to Figs. 1 to 5, inclusive, of the drawing, 1 indicates the forward part of an automobile, 2 the usual fixed headlights, and 3 indicates a tie-rod which is commonly used on automobiles and which is connected to the headlights. Upon the central part of the tie-rod I secure a fitting 4, having a vertical bore or opening 5, adapted to receive a tube 6. This tube is secured against vertical movement by suitable means, such as a cross-pin 8, inserted into a transverse opening in the fitting 4 and engaging a niche in the side of the tube. The fitting and tube constitute a bracket for supporting the spotlight 11. As shown, the tube 6 extends above and below the fitting, and within the tube is arranged a rod 9, having a cap 7, secured to its upper end and resting upon the top of the tube. The cap serves as a collar to support the vertical rod. The lower end of this rod has a threaded connection 10, with the spotlight 11. The cap or collar 7 is conveniently secured to the supporting rod 9 by one member 14, of a two-part fitting 12, for connecting the supporting rod with an operating rod 16. As shown in Fig. 4, the part 14, which constitutes a lever, has one end threaded into the cap and rod 9. This lever is connected by a pivotal joint 13 with an L-shaped arm 15, which constitutes the other member of said fitting, one end of said arm being connected to the operating rod 16, which extends backward to a point convenient to the driver's seat. As shown, the rod 16 extends into a central bore 17 in the arm 15, and is secured by a clamp 18, engaging threads on the arm. The rod 16, which may be a wire, is inclosed in a tubular guide 20, and extends to a knob 19. This knob is connected to a sleeve 21 which surrounds the guide 20 and is slidable in a sleeve 22, the latter being fixed to the dashboard 22ª of the vehicle by nuts 23 and 24. With this arrangement, by pulling the rod rearward, the spot light will be turned to the left, and by moving it forward the light will be turned to the right, while in an intermediate position of the knob the light will be set so as to throw its beams straight ahead.

In Figs. 6 and 7, an arrangement is shown for turning the light to the right or left by means of pedals 29, secured to a rod 30, on the forward end of which is arranged a lever 31, projecting upwardly in front of the vehicle, and pivotally connected to a fitting 12, which is connected to the rod which supports the spotlight, the same as in the previously described figures. The pedals 29 are arranged on opposite sides of the rod 30, and a spring 32 normally holds the rod in a central position with the spot light facing straight ahead. It will be evident that depressing one treadle will turn the light in one direction, and depressing the other treadle will turn the light in the opposite direction.

What I claim is:

1. The combination with an automobile having a transverse rod at its forward end, of a bracket secured to said rod, the said bracket comprising a fitting having a vertical opening and a tube secured in said opening, a vertically arranged supporting rod or post journaled in said tube, a lamp secured to said post, a lever secured to said post and projecting laterally therefrom, and an operating rod connected to said lever and extending rearwardly to a point convenient to the driver's seat.

2. The combination with an automobile having a transverse rod at its forward end, of a bracket secured to said rod, the said bracket comprising a fitting having a vertical opening and a tube secured in said opening, a vertically arranged supporting rod or post journaled in said tube, a lamp secured to the lower end of said post, a lever secured to the upper end of said post and projecting laterally therefrom, and an operating rod connected to said lever and extending rearwardly to a point convenient to the driver's seat.

In testimony whereof I affix my signature in presence of two witnesses.

WILLIAM B. HAINES.

Witnesses:
MAHLON DYER,
FRANK D. RÜGEL.